Nov. 24, 1970  W. KES ET AL  3,543,008
PULSE GENERATING DEVICE
Filed May 22, 1968  3 Sheets-Sheet 1

INVENTORS
WILLIAM KES
ARTHUR W. KROLL
WILLIAM L. HERRON
BY *Lindsey, Prutzman and Hayes*
ATTORNEY United States Patent Office 3,543,008
Patented Nov. 24, 1970

3,543,008
PULSE GENERATING DEVICE
William Kes, Avon, Arthur W. Kroll, Wethersfield, and William L. Herron, West Hartford, Conn., assignors to Veeder Industries Inc., Hartford, Conn., a corporation of Connecticut
Filed May 22, 1968, Ser. No. 731,159
Int. Cl. G06f 7/38
U.S. Cl. 235—92                    9 Claims

ABSTRACT OF THE DISCLOSURE

A fuel dispensing system having a register for registering the cost and volumetric amounts of fuel delivered, an auxiliary counter for providing an auxiliary registration of the cost amount of fuel delivered and a pulse generating device driven with the cost counter of the register connected to index the auxiliary counter to record the cost amount of each fuel delivery within a predetermined tolerance. The pulse generating device includes a pulse generator having a switch which is periodically closed to generate pulses as fuel is delivered and a pulse control circuit operated by the pulse generator to produce a train of evenly spaced pulses for indexing the counter and in which the first pulse is initiated after a predetermined incremental amount of fuel is delivered.

BRIEF DESCRIPTION OF THE INVENTION

The present invention relates to fluid dispensing systems and more particularly to fuel dispensing systems of the type having a pulse generator driven to provide a train of pulses in accordance with the volumetric and/or cost amount of fuel delivered and a counter operated by the pulses to record the amount of fuel delivered.

It is a principal aim of the present invention to provide a new and improved pulse generating device for a fuel dispensing system for indexing a digitally operated counter of the system within a stricter tolerance to more accurately record the amount of fuel delivered.

It is another aim of the present invention to provide a new and improved pulse generating device for a fuel dispensing system which is adapted to index a counter within the desired accuracy without requiring the pulse generating device to be mechanically reset between fuel deliveries.

It is a further aim of the present invention to provide a pulse generating device usable with conventional fuel dispensing systems to more accurately record the amount of the fuel delivered.

It is another aim of the present invention to provide a new and improved electrical pulse generating device for producing electrical pulses for indexing an electromagnetic counter.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

DESCRIPTION OF THE PREFERRED EMBODIMENTS

Figure 1:
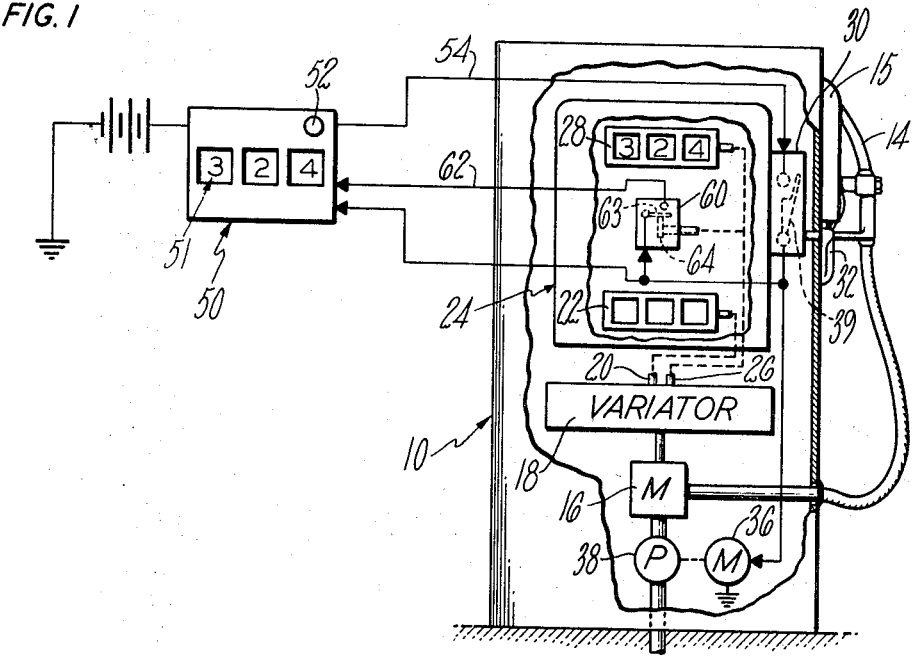
FIG. 1 is a schematic view partly broken away and partly in section showing a fuel dispensing system incorporating a pulse generating device in accordance with the present invention.

Referring now to the drawings in detail wherein like reference numerals indicate like parts throughout the several figures, a fuel dispensing system incorporating an embodiment of the present invention is shown including a fuel pump 10 having a nozzle 14 for delivering fuel and a suitable nozzle storage receptacle 15 for storing the nozzle 14 between deliveries. In a conventional manner, a meter 16 in the fuel line provides an input to a variator 18 which may be appropriately set to establish the desired unit volume price of the fuel dispensed. The variator has a first output 20 connected for driving a volume counter 22 of a resettable register 24 and a second output 26 connected for driving a cost counter 28 of the register such that the volume counter registers the volume of the fuel dispensed and the cost counter 28 registers the cost of the fuel dispensed in accordance with the unit volume price established by the variator setting.

The register 24 includes a suitable reset mechanism 30 which is shown operable by a control handle 32 positioned adjacent the storage receptacle 15 such that the handle 32 has to be rotated to its vertical or "off" position to permit the nozzle to be placed in its storage receptacle, for example at the completion of a fuel delivery, and the nozzle has to be removed from its storage receptacle to permit the handle 32 to be rotated to its horizontal or "on" position to reset the register 24. The handle 32 also provides in a known manner for de-energizing the motor 36 for the usual fuel pump 38 when the handle 32 is turned to its "off" position, for which purpose a master switch 39 is provided, and the reset mechanism 30 provides for re-energizing the motor 36 with the master switch 39 after the counters 22, 28 of the register 24 have been reset.

The fuel dispensing system includes an auxiliary readout device 50 usable for example to provide a remote readout of the cost and/or volumetric amount of fuel delivered as for accounting purposes or for conveniently displaying the cost and/or volume of the fuel dispensed to the driver of the vehicle being fueled. For simplicity, however, the exemplary readout device 50 has a single counter 51 which is connected to provide a readout of the cost only.

The auxiliary cost counter 51 may be designed to be separately reset, for which purpose a reset button 52 is shown provided, and the circuit of the readout device 50 may be suitably designed to supply power to the master switch 39 via the lead 54 only after the counter 51 is reset. Alternatively, the circuit of the readout device 50 may be designed to provide for automatically resetting the counter 51 when the pump motor 36 is re-energized at the commencement of a fuel delivery.

An electrical pulse generator 60 is connected to be driven by the input 26 to the cost counter 28 to generate a train of electrical pulses in the lead 62 in accordance with the cost amount of fuel delivered (i.e., one pulse for each predetermined incremental cost amount of fluid delivered), and lead 62 is connected via pulse control circuitry hereinafter described to index the counter 51 of the readout device 50. An exemplary pulse generator 60 is schematically shown in FIG. 1 comprising a switch or contactor 63 and a switch operator or cam 64 which is driven by the input 26. The switch cam 64 is unaffected by the register reset mechanism 30 when the register 24 is reset and accordingly the contactor 63 may be closed when the pump motor 36 is re-energized to initiate a pulse which might be completed momentarily after the delivery commences depending on the initial position of the cam 64. More generally the first pulse could be initiated or completed at any time during the delivery of the first of said predetermined incremental amounts of gasoline and succeeding pulses would occur thereafter with a spacing equal to said incremental amounts.

The cost counter 28 is shown comprising a bank of three number wheels which for example provide a registration of the cost of the fuel delivered in 1 cent steps or increments. The auxiliary counter 51 is also shown with three number wheels for registering the cost of the fuel delivered within 1 cent increments so that the readout of the counter 51 will substantially correspond to that of the cost counter 28. The auxiliary counter 51 may be any suitable pulse operated counter and may be conveniently provided by a bank of resettable single wheel electromagnetic counters of the type which are indexed or stepped at the end of each electrical operating pulse. It should be seen, however, that the readout of the auxiliary counter 51 will not continuously correspond exactly to the readout of the cost counter 28 where as in the conventional manner, the cost counter 28 is driven in a gradual or analog fashion.

In accordance with one embodiment of the present invention the pulse generator 60 is driven to provide a plurality of pulses for each count of the counter 51 or the corresponding incremental amount of fuel (and therefore in the described embodiment a plurality of pulses for each 1 cent of fuel) and the resulting train of pulses produced by the pulse generator 60 provide input pulses to a pulse control circuit to produce output pulses for indexing the counter 51 in a manner synchronized within an acceptable tolerance with the fuel delivery so that the auxiliary counter reading corresponds to the delivered amount (and thus the reading of the counter 28) within the accuracy desired.

Figure 2:
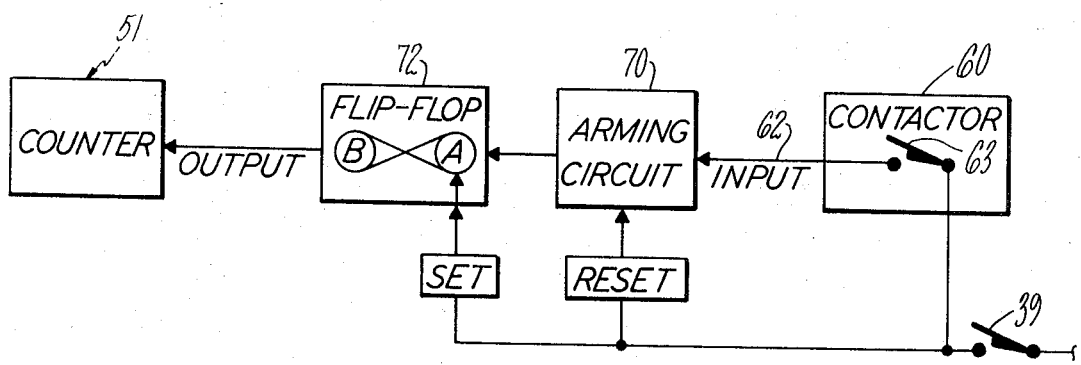
FIGS. 2, 4 and 5 are schematic views showing three exemplary embodiments of the pulse generating device.

An embodiment of a pulse control circuit shown in FIG. 2 includes an arming circuit 70 and a flip-flop circuit 72 which provide for canceling or eliminating an "overlapping" or "incomplete" pulse (i.e., an electrical pulse produced when the contactor 63 of the pulse generator 60 is closed when the motor 36 is energized) produced by the pulse generator 60 and for producing output pulses on succeeding alternate pulses of the pulse generator 60. The arming circuit 70 is utilized to maintain an open circuit to the flip-flop circuit 72 until such time as both the master switch 39 is closed and the contactor 63 is open. The flip-flop circuit 72 is thereafter triggered by succeeding input pulses produced by the pulse generator 60 to produce output pulses on succeeding alternate input pulses of the pulse generator, and the arming circuit 70 and flip-flop circuit 72 are connected to be suitably reset with the master switch 39 when the pump motor is re-energized.

Figure 3:
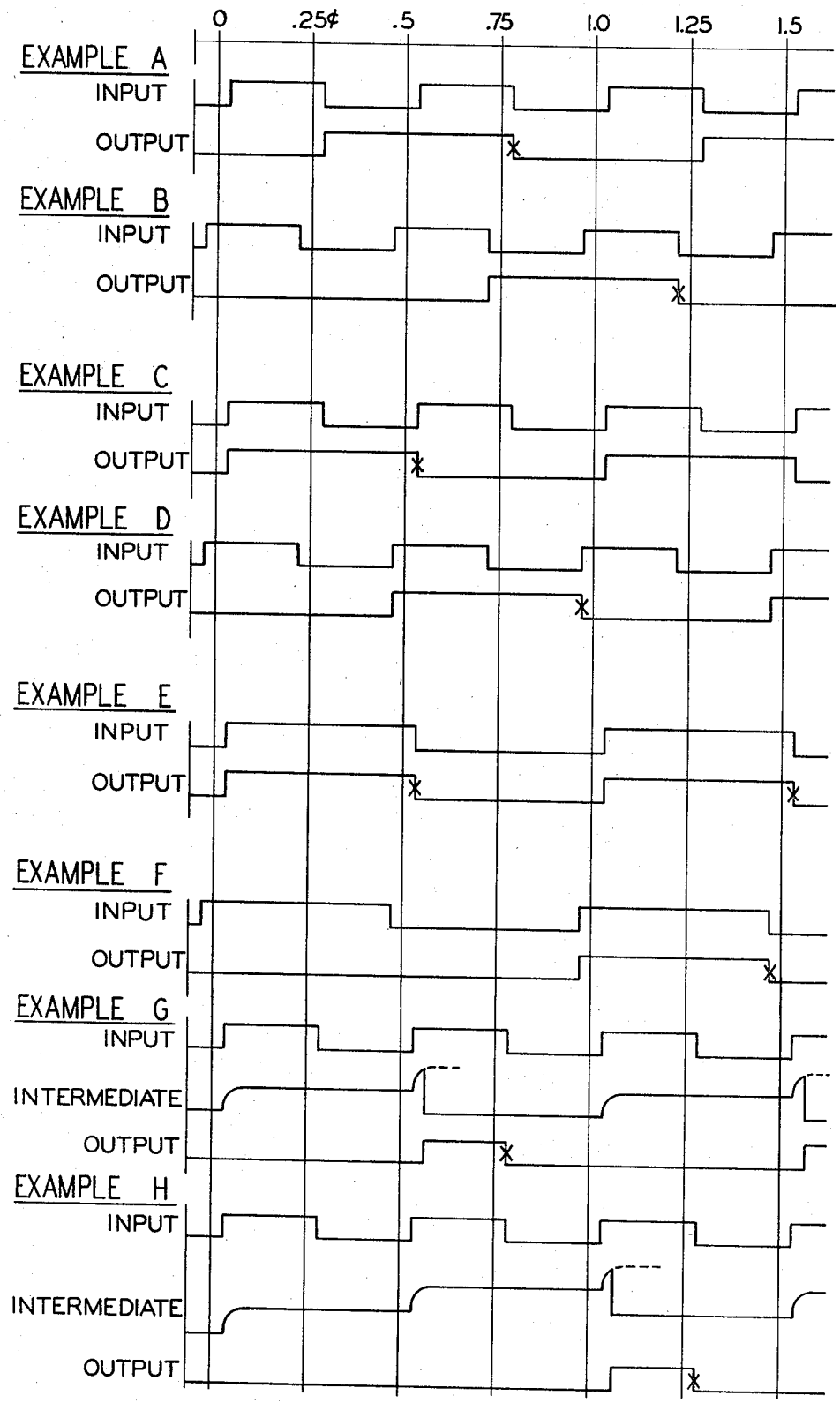
FIGS. 3 and 6 are graphs showing the relationship of the cost of the fuel delivered and the electrical pulses of the three exemplary embodiments shown in FIGS. 2, 4 and 5 and three additional exemplary embodiments.

Examples A and B of the graph of FIG. 3 portray the relationship of the input and output pulses produced by the pulse generator 60 and flip-flop circuit 72 respectively with the amount of fuel delivered. In these examples the input pulses have a pulse width of approximately ¼ cent and the output pulses have a pulse width of approximately ½ cent. In Example A the contactor 63 is open when the pump motor 36 is energized whereas in Example B the contactor 63 is closed when the pump motor 36 is energized. In both examples the counter 51 is indexed at the completion of the output pulses as shown by the X mark on the graphs. With such operation the readout of the auxiliary counter 51 will never be more than ¼ cent greater or more than ¼ cent less than the actual cost amount of fuel delivered (or the readout of the primary cost counter 28). Also it should be seen that if the input pulse width is increased or decreased, the width of the tolerance band (i.e. ±¼ cent) will remain constant but will be shifted respectively to the left (i.e. earlier stepping of the counter 51) or to the right (i.e. later stepping of the counter 51).

Although Examples A and B portray an input pulse frequency of two pulses for each count of the counter 51, a greater input pulse frequency could be employed with circuitry similar to that described and adapted to produce an output pulse frequency of one pulse for each count for counting with increased accuracy and/or within a more strict tolerance. The output pulse width may also be increased or decreased as desired and where an input pulse frequency greater than two pulses for each 1 cent of delivery is employed, the output pulse width may be made to equal either the input pulse width, the input pulse pitch (i.e. the cost amount of delivery between corresponding points of adjacent input pulses) or a whole multiple of the input pulse width or pitch. In this regard, a counting error resulting from an extra "turn-off" count, occurring when the master switch 39 is opened during an output pulse, may be reduced by reducing the output pulse width.

Thus, it should be appreciated that the timing of the stepping operation of the auxiliary counter 51 is not only a function of the particular pulse control circuit employed but also a function of the pulse width and pulse frequency of the input pulses and the design of the pulse operated counter 51 (i.e. whether the counter 51 is indexed a full count or a partial count for each output pulse and whether it is indexed at the beginning and/or the end of its operating pulse).

The circuit of FIG. 2 may be modified to delete the arming circuit 70 and to provide for example for indexing the counter 51 in the manner shown by Examples C and D of the graph of FIG. 3. As seen in these examples, an "overlapping" pulse generated by the contactor 63 at the beginning of a delivery is canceled and the counter is indexed at the beginning of the second "complete" input pulse and succeeding alternate input pulses thereafter. Thus, in these examples in which the input pulse has a width of ¼ cent and a pulse frequency of two pulses for each 1 cent of delivery, and the output pulse has a pulse width of ½ cent, the counter 51 will be initially indexed between ½ cent and 1 cent of delivery and thereafter at 1 cent intervals. Also, it will be apparent in these examples that the counter will be indexed between ½ and 1 cent regardless of the input pulse width, since the counter is indexed at the beginning of each input pulse rather than at the end of the input pulse as in Examples A and B.

Figure 5:
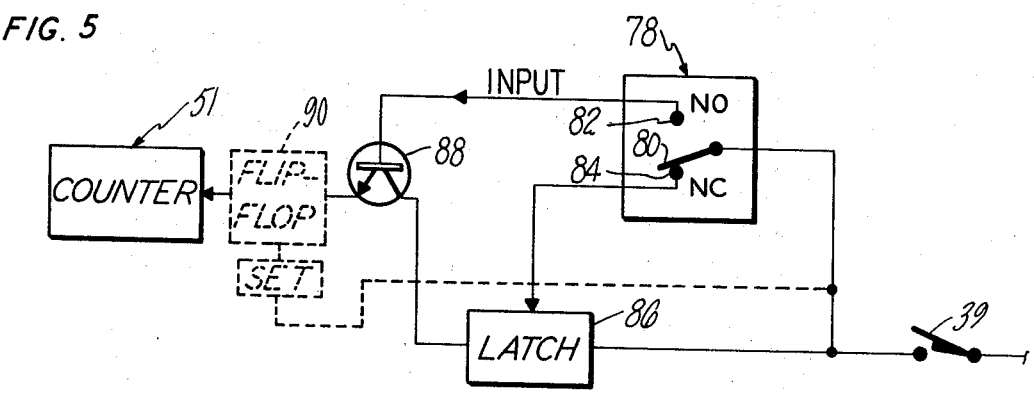

Another embodiment of the present invention is shown in FIG. 5. In this embodiment the pulse generator 78 is provided with a contactor 80 having a normally open contact 82 and a normally closed contact 84. The normally closed contact 84 is connected to operate a latch relay 86 which is adapted to connect the power to a transistor driver or relay 88. Thereafter the normally open contact 82 is adapted to index the counter. The operation of this control circuit is shown by Examples E and F in the graph of FIG. 3 wherein it is seen that each input pulse generated with the contact 82 has a pulse width of ½ cent and a pulse frequency of one pulse for each 1 cent of delivery and the initial output pulse for indexing the counter may occur in the interval between ½ and 1½ cents of delivery. Also, an "incomplete" pulse is canceled and the counter is indexed at the end of the first "complete" input pulse.

The embodiment of FIG. 5 could be modified to provide for driving the pulse generator 78 to produce a plurality of pulses for each 1 cent of delivery and to include a suitable flip-flop circuit 90 shown in broken lines in FIG. 5 which would provide one output pulse for each 1 cent of delivery and which is connected to be reset prior to the commencement of each delivery with the master switch 39 when the pump motor is re-energized.

Figure 4:
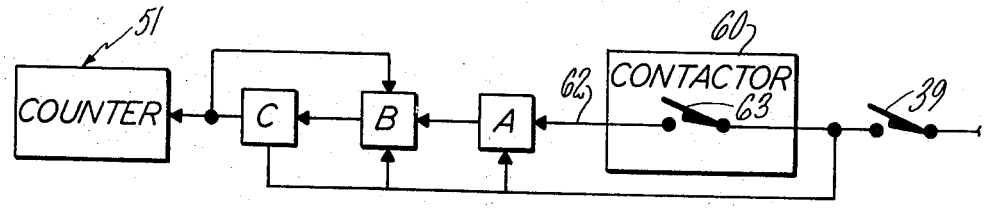
Figure 6:
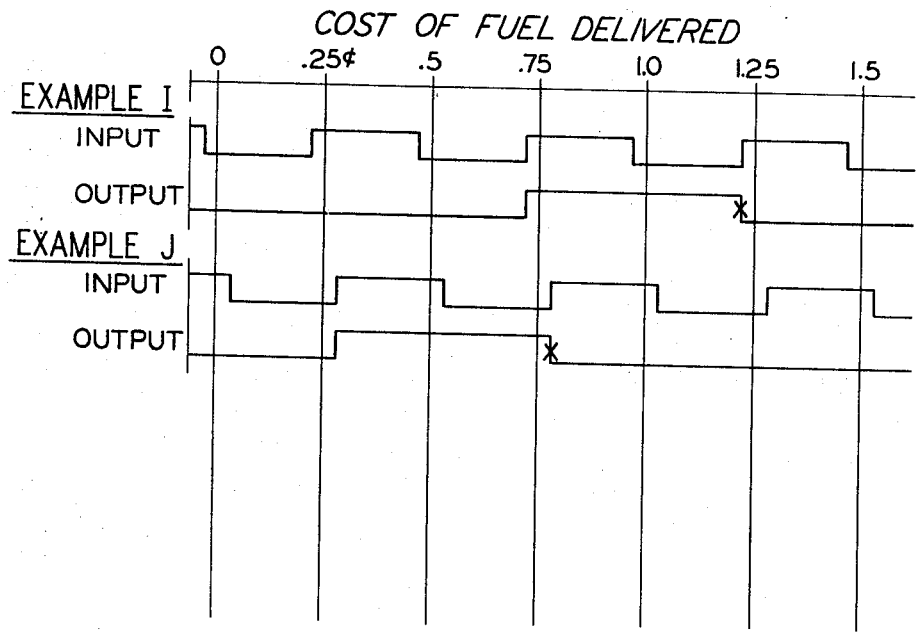

In FIG. 4 a pulse control circuit is schematically shown which provides for indexing the counter 51 as shown in Examples I and J of FIG. 6. This pulse control circuit is shown used with input pulses having a pulse width of ¼ cent and a frequency of two pulses for each 1 cent of delivery and is adapted to produce output pulses with a pulse width of ½ cent. The circuit portion A functions to maintain an open circuit to the circuit portion B until the completion of the first pulse (whether "complete" or "incomplete") whereupon the circuit is completed to the remaining circuit portions B and C which thereafter provide in effect a divide-by-two circuit which produces an output pulse with a ½ cent pulse width for each two input pulses.

It should be appreciated that other types of circuits could be employed in accordance with the present invention to provide for indexing the counter within an acceptable range of accuracy, and the present invention is not restricted to the circuitry disclosed and described herein. For example, suitable circuitry could be employed to provide an input pulse, an intermediate pulse or signal and an output pulse as shown in Examples G and H of the graph of FIG. 3. In these examples the input pulse is employed to generate a staircase shaped intermediate pulse which upon reaching a predetermined potential level triggers an output pulse to index the counter and decreases in potential to its initial potential level (Example G) or an intermediate potential level (Example H). In the latter example the output pulses are timed with the third and succeeding alternate pulses, and the circuit provides in effect for canceling the first input pulse (whether "complete" or "incomplete") and to provide one output pulse for each two succeeding input pulses.

It can be seen that the present invention is directed to improving the accuracy of the auxiliary counter 51 such that it will provide a digital readout in agreement with the amount of fuel delivered (and with the readout of the primary counter 28 of the pump register 24) within the desired tolerance. Significantly, the pulsing system of the present invention provides for indexing the counter 51 after a minimum amount and before a maximum amount of fuel is delivered, which minimum and maximum amounts are dependent on the circuitry used, the frequency and pulse width of the pulses generated by the pulse generator, and the type of magnetic counter employed. Also, at the termination of a delivery when the control handle 32 is turned to its "off" position, an "incomplete" or "overlapping" pulse (which occurs if the pulse generator contactor is closed when the control handle 32 is turned to its "off" position) may or may not have the same effect as a regular complete pulse depending on the circuitry used and the relationship of the output pulses to the input pulses.

Although the present invention has been described in connection with electrical pulses and an electromagnetically operated counter, equivalent mechanical or fluid systems incorporating the present invention could be readily devised and, for example, a pneumatically operated counter and a pneumatic pulse system could be employed in accordance with the present invention to provide digital readout within the desired accuracy.

As will be apparent to persons skilled in the art, various modifications and adaptations of the structure above described will become readily apparent without departure from the spirit and scope of the invention, the scope of which is defined in the appended claims.

We claim:

1. In a fluid dispensing system having fluid delivery means, a pulse generating device connected to the fluid delivery means for producing an output pulse for each predetermined incremental amount of fluid delivered, a delivery counting device connected to be indexed in stepwise fashion by the output pulses, delivery control means operable to an ON condition to condition the fluid delivery means to be operative for delivery fluid to initiate a fluid delivery and to condition the pulse generating device for producing said output pulses and operable to an OFF condition to condition the fluid delivery means to be inoperative for delivering fluid at the completion of a delivery and to condition the pulse generating device to be inoperative for producing said output pulses, the improvement wherein the pulse generating device comprises a nonresettable pulse generator connected to the fluid delivery means for producing a train of input pulses by producing an input pulse for each pre-established amount of fluid delivered, and settable pulse control means for controlling the train of input pulses to provide a train of said output pulses for indexing the counting device, the pulse control means being settable by operation of the delivery control means between its ON and OFF conditions to provide a train of said output pulses for each fluid delivery in which the first output pulse is initiated after the delivery of fluid commences irrespective of whether the first input pulse is initiated by the nonresettable pulse generator upon the operation of the delivery control means to its ON condition and before the commencement of the delivery of fluid.

2. The fluid dispensing system of claim 1 wherein the delivery counting device is adapted to count in fixed amounts and wherein the pulse generating device provides output pulses having a pulse width of substantially one-half said fixed amount.

3. The fluid dispensing system of claim 1 wherein the pulse generator is connected to the fluid delivery means to produce a fixed plurality of input pulses for each said predtermined incremental amount of fluid delivered and wherein the pulse control means controls the train of input pulses ot provide a train of output pulses having an output pulse for each said predetermined incremental amount of fluid delivered.

4. The fluid dispensing system of claim 3 wherein the pulse control means provides a train of output pulses having a pulse width less than one-half said predetermined incremental amount.

5. The fluid dispensing system of claim 3 wherein the pulse control means provides a train of output pulses having a pulse width greater than one-half said predetermined incremental amount.

6. In a fluid dispensing system having fluid delivery means, delivery control means operable to condition the fluid delivery means to be operative for deliverying fluid to initiate a fluid delivery and operable to condition the fluid delivery means to be inoperative for delivering fluid at the completion of a delivery, a pulse generating device connected to the fluid delivery means for producing an output pulse for each predetermined incremental amount of fluid delivered, and a delivery counting device connected to be indexed in stepwise fashion by the output pulses, the improvement wherein the pulse generating device comprises a pulse generator connected to the fluid delivery means for producing a train of input pulses in accordance with the amount of fluid delivered, and pulse control means for controlling the train of input pulses to provide a train of said output pulses for indexing the counting device, the pulse control means being connected to be conditioned by operation of the delivery control means to provide a train of said output pulses for each fluid delivery in which the first output pulse is initiated after the delivery of fluid commences, the pulse generator comprising first switch means and switch operating means connected to the fluid delivery means to sequentially open and close the first switch means ot produce said input pulses, and the pulse control means comprising relay means operable for connecting the first switch means for indexing the counting device and relay control means for operating the relay means, the delivery control means and pulse generator being connected to operate the relay control means to connect the first switch means for indexing the counting device with the first switch means open and the delivery control means operated to condition the fluid delivery means to be operative for delivering fluid.

7. The fluid dispensing system of claim 6 wherein the pulse generator comprises second switch means adapted to be opened and closed by said switch operating means, and wherein said second switch means cooperates with the delivery control means to operate the relay means to connect the first switch means for indexing the counting device.

8. The fluid dispensing system of claim 7 wherein the pulse generator comprises a single pole double throw switch providing said first and second switch means.

9. In a fluid dispensing system having fluid delivery means, delivery control means operable to condition the fluid delivery means to be operative for delivering fluid to initiate a fluid delivery and operable to condition the fluid delivery means to be inoperative for deliverying fluid at the completion of a delivery, a pulse generating device connected to the fluid delivery means for producing an output pulse for each predetermined incremental amount of fluid delivered and a delivery counting device connected to be indexed in stepwise fashion by the output pulses, the improvement wherein the pulse generating device comprises a pulse generator connected to the fluid delivery means for producing a train of input pulses in accordance with the amount of fluid delivered, and pulse control means for controlling the train of input pulses to provide a train of said output pulses for indexing the counting device, the pulse control means being connected to be conditioned by operation of the delivery control means to provide a train of said output pulses for each fluid delivery in which the first output pulse is initiated after the delivery of fluid commences, the pulse control means providing for canceling an input pulse of a fluid delivery occurring upon the operation of the delivery control means to condition the fluid delivery means to be operative for delivering fluid and before the commencement of a fluid delivery.

References Cited
UNITED STATES PATENTS 3,400,255  9/1968  Vroom _____ 235—92
3,413,452  11/1968  Schlein _____ 235—92

SAMUEL F. COLEMAN, Primary Examiner

U.S. Cl. X.R.

222—26